(12) United States Patent
Lee et al.

(10) Patent No.: US 8,761,748 B2
(45) Date of Patent: Jun. 24, 2014

(54) MOBILE TERMINAL AND METHOD OF CONTROLLING THE MOBILE TERMINAL

(75) Inventors: Won Young Lee, Seoul (KR); Kyung A Hong, Seoul (KR)

(73) Assignee: LG Electronics Inc., Seoul (KR)

( * ) Notice: Subject to any disclaimer, the term of this patent is extended or adjusted under 35 U.S.C. 154(b) by 604 days.

(21) Appl. No.: 12/470,392

(22) Filed: May 21, 2009

(65) Prior Publication Data
US 2009/0291678 A1    Nov. 26, 2009

(30) Foreign Application Priority Data
May 23, 2008   (KR) .................. 10-2008-0048181

(51) Int. Cl.
*H04M 3/00*    (2006.01)

(52) U.S. Cl.
USPC .................. 455/418; 455/550.1; 379/433.06; 379/433.07

(58) Field of Classification Search
USPC ............. 455/550.1, 556.1, 566, 566.2, 414.1, 455/414.3, 414.4, 418; 379/433.06, 433.07
See application file for complete search history.

(56) References Cited

U.S. PATENT DOCUMENTS

| | | | |
|---|---|---|---|
| 6,192,381 B1 * | 2/2001 | Stiegemeier et al. | 715/210 |
| 7,003,327 B1 * | 2/2006 | Payne et al. | 455/566 |
| 7,058,393 B2 * | 6/2006 | Sugane | 455/414.1 |
| 7,356,361 B1 | 4/2008 | Hawkins et al. | |
| 7,519,386 B2 * | 4/2009 | Kespohl et al. | 455/550.1 |
| 7,982,720 B2 * | 7/2011 | Rosenberg et al. | 345/173 |
| 2002/0128047 A1 * | 9/2002 | Gates | 455/566 |
| 2003/0122784 A1 * | 7/2003 | Shkolnikov | 345/169 |
| 2004/0137921 A1 * | 7/2004 | Valloppillil et al. | 455/466 |
| 2004/0253973 A1 * | 12/2004 | Nguyen et al. | 455/550.1 |
| 2005/0026658 A1 * | 2/2005 | Soejima | 455/575.1 |
| 2005/0054376 A1 | 3/2005 | Griffin et al. | |
| 2007/0082708 A1 | 4/2007 | Griffin | |
| 2008/0119175 A1 * | 5/2008 | Min et al. | 455/414.2 |
| 2009/0088204 A1 * | 4/2009 | Culbert et al. | 455/556.1 |

* cited by examiner

*Primary Examiner* — Raymond Dean
(74) *Attorney, Agent, or Firm* — Lee, Hong, Degerman, Kang & Waimey

(57) ABSTRACT

A mobile terminal and a method of controlling a mobile terminal are provided. The method includes assigning at least a first function and a second function to each of one or more variable function keys and performing a first function assigned to a selected one of the variable function keys when the mobile terminal is in a first operating mode and performing a second function assigned to the selected one of the variable function keys when the mobile terminal is in a second operating mode, while maintaining the functions of non-variable function keys.

14 Claims, 12 Drawing Sheets

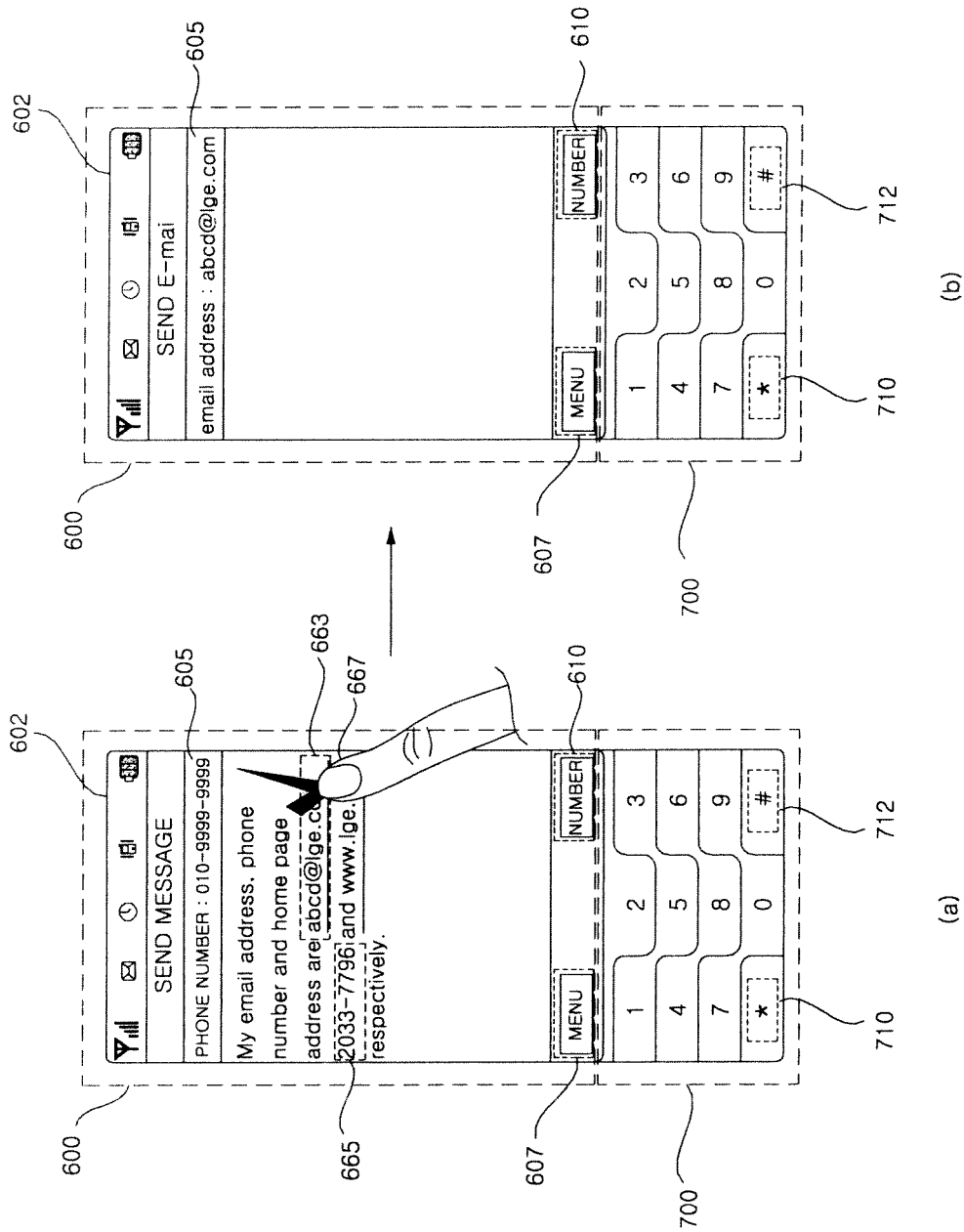

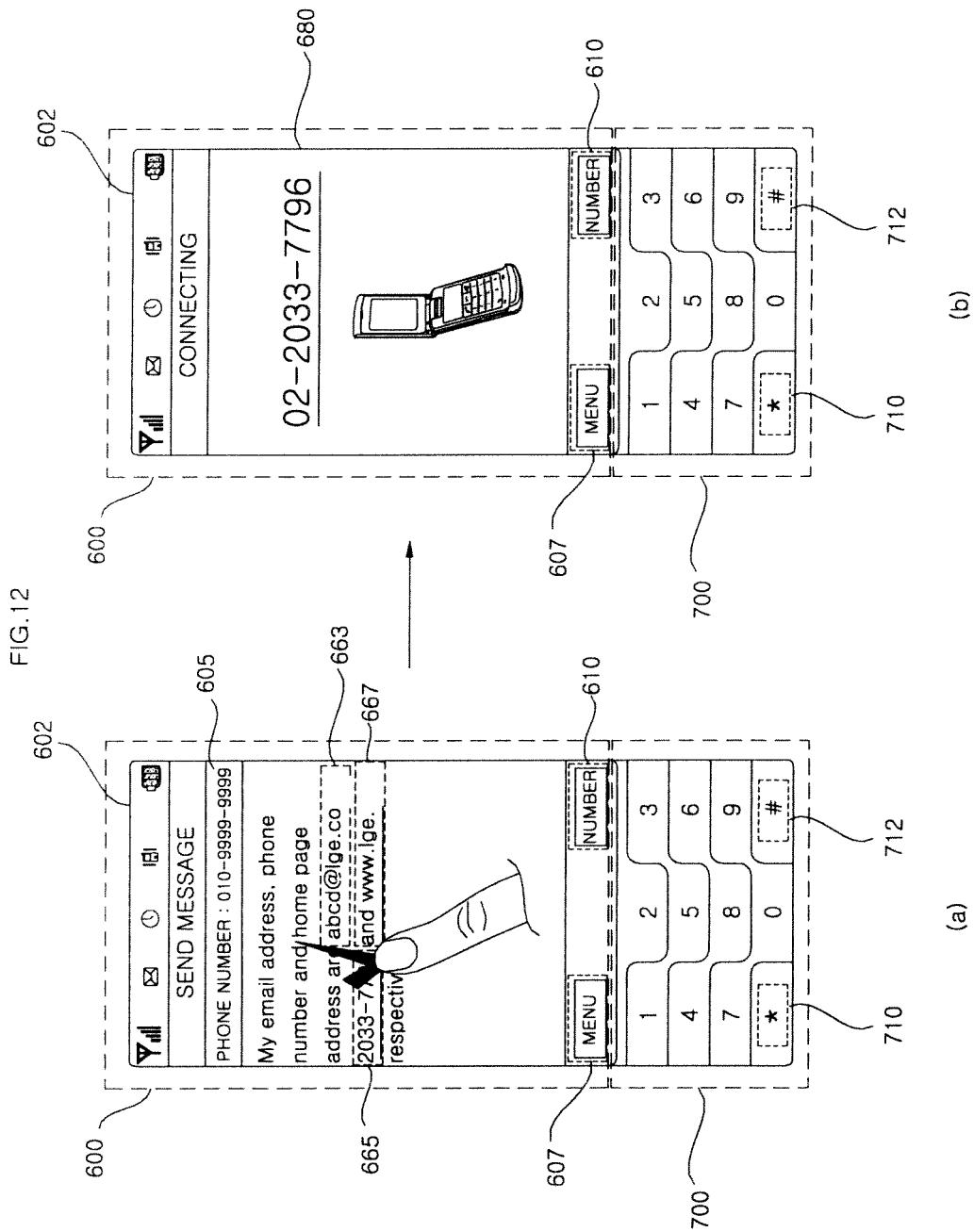

MOBILE TERMINAL AND METHOD OF CONTROLLING THE MOBILE TERMINAL

CROSS-REFERENCE TO RELATED APPLICATIONS

Pursuant to 35 U.S.C. §119(a), this application claims the benefit of earlier filing date and right of priority to Korean Application No. 10-2008-0048181, filed on May 23, 2008, the contents of which is incorporated by reference herein in its entirety.

FIELD OF THE INVENTION

The present invention is directed to a mobile terminal and a method of controlling the mobile terminal in which the operation of the mobile terminal can be controlled using a number of input keys whose functions adaptively vary according to an operating mode.

DESCRIPTION OF THE RELATED ART

Mobile terminals are portable devices that can provide users with various services, such as a voice calling service, a video calling service, an information input/output service, and a data storage service. As the types of services provided by mobile terminals diversify, an increasing number of mobile terminals have been equipped with various complicated functions, such as capturing photos or moving pictures, playing music files or moving image files, providing game programs, receiving broadcast programs and providing wireless Internet services. Therefore, mobile terminals have evolved into multimedia players.

Various attempts have been made to realize these complicated functions as hardware devices or software programs. For example, various user interface (UI) environments that allow users to easily search for and choose desired functions have been developed. Furthermore, the demand for various designs for mobile terminals, such as a double-sided liquid crystal display (LCD) or a full touch screen, has steadily grown due to a growing tendency of users to consider mobile terminals as personal items that can represent personal individuality.

However, there is a restriction in allocating sufficient space for a UI, such as a display device or a keypad of a mobile terminal without compromising the mobility and the portability of the mobile terminal. Specifically, the functions of input keys or touch keys of a typical mobile terminal may be changed only in a limited way according to an operating mode or may always be the same regardless of the operating mode. Therefore, there is a restriction in the number of hot keys or other necessary input keys that can be provided due to a limited display size of a typical mobile terminal. Furthermore, a typical mobile terminal generally requires complicated key manipulations in order to input characters or use various additional functions.

SUMMARY OF THE INVENTION

In one aspect of the present invention, a method of controlling one or more variable function keys of a mobile terminal is provided. The method includes assigning at least a first function and a second function to each of the one or more variable function keys, the first function corresponding to a first operating mode and the second function corresponding to a second operating mode, performing the first function assigned to a specific one of the one or more variable function keys if the specific one of the one or more variable function keys is input when the mobile terminal is in the first operating mode and performing the second function assigned to the specific one of the one or more variable function keys if the specific one of the one or more variable function keys is input when the mobile terminal is in the second operating mode, and performing the same function assigned to a specific non-variable function key when the specific non-variable function key is input when the mobile terminal is in the first operating mode or the second operating mode.

It is contemplated that the one or more variable function keys comprise at least a '*' key or a '#' key. It is further contemplated that assigning the at least a first function and a second function to each of the one or more variable function keys includes processing an input from a user.

It is contemplated that the first operating mode is an idle mode and the second operating mode is a character input mode. It is further contemplated that the method includes displaying a touch keypad input window including the one or more variable function keys. Preferably, the method includes switching the function of each of the one or more variable function keys between the assigned first function and the assigned second function and maintaining the assigned function of any non-variable function key when the mobile terminal is switched from the first operating mode to the second operating mode and switching the function of each of the one or more variable function keys between the assigned second function and the assigned first function and maintaining the assigned function of any non-variable function key when the mobile terminal is switched from the second operating mode to the first operating mode.

In another aspect of the present invention, a mobile terminal is provided. The mobile terminal includes a user input unit including one or more variable function keys, wherein at least a first function and a second function are assigned to each of the one or more variable function keys, the first function corresponding to a first operating mode and the second function corresponding to a second operating mode and a controller configured to perform the first function assigned to a specific one of the one or more variable function keys if the specific one of the one or more variable function keys is input when the mobile terminal is in the first operating mode and perform the second function assigned to the specific one of the one or more variable function keys if the specific one of the one or more variable function keys is input when the mobile terminal is in the second operating mode and further configured to perform the same function assigned to a specific non-variable function key when the specific non-variable function key is input when the mobile terminal is in the first operating mode or the second operating mode.

It is contemplated that the one or more variable function keys comprise at least a '*' key or a '#' key. It is further contemplated that the controller is further configured to process an input from a user in order to assign the at least a first function and a second function to each of the one or more variable function keys comprises.

It is contemplated that the first operating mode is an idle mode and the second operating mode is a character input mode. It is further contemplated that the input unit includes a display and the controller is further configured to control the display to display a touch keypad input window including the one or more variable function keys. Preferably, the controller is further configured to switch the function of each of the one or more variable function keys between the assigned first function and the assigned second function and maintain the assigned function of any non-variable function key when the mobile terminal is switched from the first operating mode to the second operating mode and switch the function of each of the one or more variable function keys between the assigned second function and the assigned first function and maintain the assigned function of any non-variable function key when the mobile terminal is switched from the second operating mode to the first operating mode In another aspect of the present invention, a method of controlling a mobile terminal having a plurality of character keys and one or more variable function keys is provided. The method includes displaying an input string generated using one or more of the plurality of character keys, determining that one of the one or more variable function keys is input and dividing the displayed input string into one or more segments and displaying the segments in a predefined manner if the input string is a number string or displaying one or more previously-stored email addresses that include the input string, wherein the functions of each of the one or more variable function keys is different in a first operating mode and a second operating mode. Preferably, the predefined manner includes representing the one or more segments as a phone number, a date, or a time.

In another aspect of the present invention, a mobile terminal is provided. The mobile terminal includes a user input unit having a plurality of character keys and one or more variable function keys, wherein the functions of each of the one or more variable function keys are different in a first operating mode and a second operating mode, a display module configured to display information and a controller configured to control the display unit to display an input string generated using one or more of the plurality of character keys, determine that one of the one or more variable function keys is input and divide the input string into one or more segments and display the segments in a predefined manner if the input string is a number string or display one or more previously-stored email addresses that include the input string. Preferably, the predefined manner includes representing the one or more segments as a phone number, a date, or a time.

In another aspect of the present invention, a method of controlling a mobile terminal having a plurality of character keys and one or more variable function keys is provided. The method includes displaying a text message generated using one or more of the plurality of character keys, determining that one of the one or more variable function keys is input and distinctively displaying one or more string links included in the text message such that the displayed one or more string links are easily recognizable, wherein each of the one or more string links corresponds to a specific operating mode, wherein the functions of each of the one or more variable function keys is different in a first operating mode and a second operating mode.

It is contemplated that each of the one or more string links represents a phone number, an e-mail address or a web page address. It is further contemplated that the method includes switching the mobile terminal to an e-mail transmission mode for sending an email if a string link representing an e-mail address is selected from the text message, switching the mobile terminal to a web access mode for accessing a web page if a string link representing a web page address is selected from the text message, switching the mobile terminal to a call mode for making a telephone call if a string link representing a phone number is selected from the text message and storing at least one of the one or more string links if a storage mode is selected one or more string links. Preferably, storing at least one of the one or more string links includes classifying the one or more string links and storing each of the at least one of the one or more string links in a phone number list, an e-mail address list or a web page address list according to the classification.

In another aspect of the present invention, a mobile terminal is provided. The mobile terminal includes a user input unit having a plurality of character keys and one or more variable function keys, wherein the functions of each of the one or more variable function keys are different in a first operating mode and a second operating mode, a display module configured to display information and a controller configured to control the display unit to display a text message generated using one or more of the plurality of character keys, determine that one of the one or more variable function keys is input and control the display unit to distinctively display one or more string links included in the text message such that the displayed one or more string links are easily recognizable, wherein each of the one or more string links corresponds to a specific operating mode.

It is contemplated that each of the one or more string links represents a phone number, an e-mail address or a web page address. It is further contemplated that the controller is further configured to switch the mobile terminal to an e-mail transmission mode for sending an email if a string link representing an e-mail address is selected from the text message, switch the mobile terminal to a web access mode for accessing a web page if a string link representing a web page address is selected from the text message, switch the mobile terminal to a call mode for making a telephone call if a string link representing a phone number is selected from the text message and store at least one of the one or more string links if a storage mode is selected one or more string links. Preferably, the controller is further configured to classify the one or more string links and store each of the at least one of the one or more string links in a phone number list, an e-mail address list or a web page address list according to the classification.

Additional features and advantages of the invention will be set forth in the description which follows, and in part will be apparent from the description, or may be learned by practice of the invention. It is to be understood that both the foregoing general description and the following detailed description of the present invention are exemplary and explanatory and are intended to provide further explanation of the invention as claimed.

These and other embodiments will also become readily apparent to those skilled in the art from the following detailed description of the embodiments having reference to the attached figures, the invention not being limited to any particular embodiments disclosed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

FIGS. 7 through 12 illustrate diagrams for explaining the methods of the first through third exemplary embodiments of the present invention.

DETAILED DESCRIPTION OF THE PREFERRED EMBODIMENTS

The present invention will be described in detail with reference to the accompanying drawings in which exemplary embodiments of the invention are shown. The term 'mobile terminal', as used herein, may indicate a mobile phone, a smart phone, a laptop book computer, a digital broadcast receiver, a personal digital assistant (PDA), a portable multimedia player (PMP), or a navigation device. The terms 'module' and 'unit', as used herein, may be used interchangeably.

Figure 1:
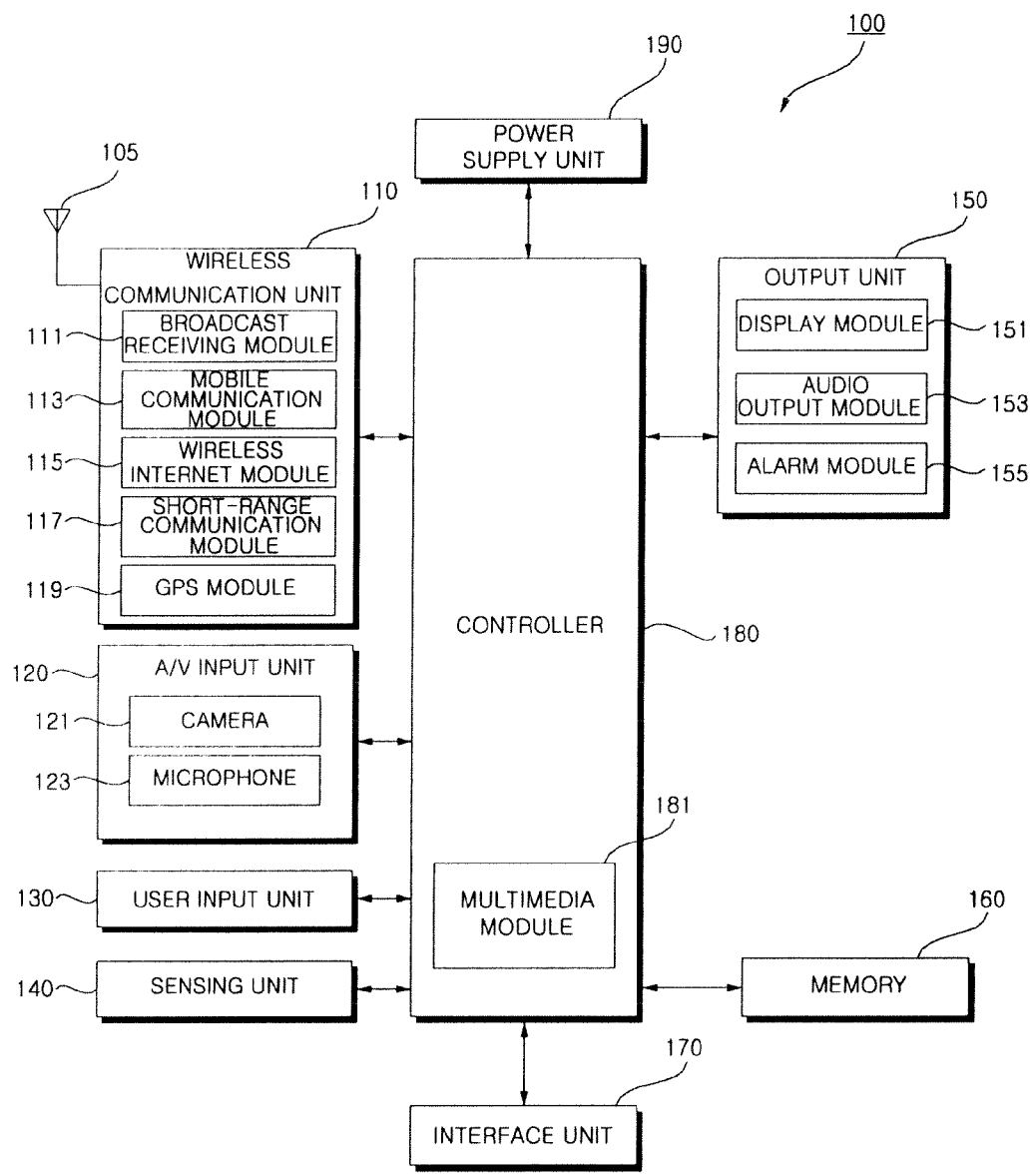
FIG. 1 illustrates a block diagram of a mobile terminal according to an exemplary embodiment of the present invention.

FIG. 1 illustrates a block diagram of a mobile terminal 100 according to an embodiment of the present invention. As illustrated in FIG. 1, the mobile terminal 100 includes a wireless communication unit 110, an audio/video (A/V) input unit 120, a user input unit 130, a sensing unit 140, an output unit 150, a memory 160, an interface unit 170, a controller 180, and a power supply unit 190.

Two or more of the wireless communication unit 110, the A/V input unit 120, the user input unit 130, the sensing unit 140, the output unit 150, the memory 160, the interface unit 170, the controller 180, and the power supply unit 190 may be incorporated into a single unit. Alternatively, some of the wireless communication unit 110, the A/V input unit 120, the user input unit 130, the sensing unit 140, the output unit 150, the memory 160, the interface unit 170, the controller 180, and the power supply unit 190 may be divided into two or more smaller units.

The wireless communication unit 110 may include a broadcast reception module 111, a mobile communication module 113, a wireless internet module 115, a short-range communication module 117, and a global positioning system (GPS) module 119.

The broadcast receiving module 111 receives a broadcast signal and/or broadcast associated information from an external broadcast managing entity via a broadcast channel. The broadcast channel may include a satellite channel or a terrestrial channel. The broadcast managing entity refers generally to a system that transmits a broadcast signal and/or broadcast associated information.

Examples of broadcast associated information include information associated with a broadcast channel, a broadcast program, and a broadcast service provider. For example, the broadcast associated information may include an electronic program guide (EPG) of digital multimedia broadcasting (DMB) and electronic service guide (ESG) of digital video broadcast-handheld (DVB-H).

The broadcast signal may be implemented, for example, as a TV broadcast signal, a radio broadcast signal, or a data broadcast signal. The broadcast signal may further include a broadcast signal combined with a TV or radio broadcast signal.

The broadcast receiving module 111 may be configured to receive broadcast signals transmitted from various types of broadcast systems. By way of non-limiting examples, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Receiving multicast signals is also possible. Data received by the broadcast receiving module 111 may be stored in a suitable device, such as the memory 160.

The mobile communication module 113 communicates wireless signals with one or more network entities, such as base station or Node-B. Such signals may represent, for example, audio, video, multimedia, control signaling, or data.

The wireless Internet module 115 supports Internet access for the mobile terminal 100. The wireless Internet module 115 may be internally or externally coupled to the mobile terminal 100.

The short-range communication module 117 facilitates relatively short-range communications. Suitable technologies for short-range communication may include, but are not limited to, radio frequency identification (RFID), infrared data association (IrDA), ultra-wideband (UWB), as well at the networking technologies commonly referred to as Bluetooth® and ZigBee®.

The global position positioning (GPS) module 119 may receive position information form a plurality of GPS satellites. The GPS module identifies or otherwise obtains the location of the mobile terminal 100. The GPS module 119 may be implemented using global positioning system (GPS) components that cooperate with associated satellites, network components, and combinations thereof.

The audio/video (A/V) input unit 120 is configured to provide audio or video signal input to the mobile terminal 100. As shown, the A/V input unit 120 includes a camera 121 and a microphone 123.

The camera 121 receives and processes image frames of still pictures or video. The microphone 123 receives an external audio signal while the mobile terminal 100 is in a particular mode, such as phone call mode, recording mode and voice recognition.

The audio signal received by the microphone 123 is processed and converted into digital data. The mobile terminal 100, and specifically the A/V input unit 120, may include assorted noise removing algorithms to remove noise generated in the course of receiving the external audio signal.

Data generated by the A/V input unit 120 may be stored in the memory 160, utilized by the output unit 150, or transmitted via one or more modules of the communication unit 110. If desired, two or more microphones 123 and/or cameras 121 may be used.

The user input unit 130 generates input data responsive to user manipulation of an associated input device or devices. Examples of such devices include a keypad, a dome switch, a touchpad such as static pressure/capacitance, a jog wheel and a jog switch. A specific example is one in which the user input unit 130 is configured as a touchpad in cooperation with a touch screen display.

The sensing unit 140 provides status measurements of various aspects of the mobile terminal 100. For example, the sensing unit 140 may detect an open/close status of the mobile terminal 100, the relative positioning of components such as a display and keypad, a change of position of the mobile terminal or a component of the mobile terminal, a presence or absence of user contact with the mobile terminal, orientation or acceleration/deceleration of the mobile terminal.

The mobile terminal 100 may be configured as a slide-type mobile terminal and the sensing unit 140 may sense whether a sliding portion of the mobile terminal is open or closed. The sensing unit 140 may also sense the presence or absence of power provided by the power supply 190, the presence or absence of a coupling or other connection between the interface unit 170 and an external device.

The sensing unit 140 may include a proximity sensor (not shown). The proximity sensor may determine whether there is an entity nearby that is approaching the mobile terminal 100 without any mechanical contact with the entity. More specifically, the proximity sensor may detect an entity that is nearby and approaching by detecting a change in an alternating magnetic field or the rate of change of static capacitance. The sensing unit 140 may include two or more proximity sensors.

The output unit 150 may include various components that support the output requirements of the mobile terminal 100. The display module 151 may be implemented to visually display information associated with the mobile terminal 100.

The display module 151 may provide a user interface (UI) or graphical user interface (GUI) that includes information associated with placing, conducting, and terminating a phone call if the mobile terminal 100 is operating in a phone call mode. The display module 151 may additionally or alternatively display images that are associated with a video call mode or a photographing mode.

One particular implementation of the present invention includes the display module 151 configured as a touch screen working in cooperation with an input device, such as a touchpad. This configuration permits the display module 151 to function both as an output device and an input device.

The display module 151 may be implemented using known display technologies including a liquid crystal display (LCD), a thin film transistor-liquid crystal display (TFT-LCD), an organic light-emitting diode display (OLED), a flexible display and a three-dimensional display. The mobile terminal 100 may include one or more display modules 151. An example of a two-display embodiment is one in which one display module 151 is configured as an internal display viewable when the terminal is in an opened position and a second display module 151 configured as an external display viewable in both the open and closed positions.

If the display module 151 and the user input unit 130 form a layer structure together and are thus implemented as a touch screen, the display module 151 may be used as both an output device and an input device. If the display module 151 is implemented as a touch screen, the display module 151 may also include a touch screen panel and a touch screen panel controller.

The touch screen panel is a transparent panel attached onto the exterior of the mobile terminal 100 and may be connected to an internal bus of the mobile terminal. The touch screen panel keeps monitoring whether the touch screen panel is being touched by a user. Once a touch input to the touch screen panel is detected, the touch screen panel transmits a number of signals corresponding to the touch input to the touch screen panel controller.

The touch screen panel controller processes the signals transmitted by the touch screen panel and transmits the processed signals to the controller 180. The controller 180 determines whether a touch input has been generated and which part of the touch screen panel has been touched based on the processed signals transmitted by the touch screen panel controller.

FIG. 1 further illustrates the output unit 150 having an audio output module 153, which supports the audio output requirements of the mobile terminal 100. The audio output module 153 may be implemented using one or more speakers, buzzers, other audio producing devices, or combinations thereof.

The audio output module 153 functions in various modes such as call-receiving mode, call-placing mode, recording mode, voice recognition mode and broadcast reception mode. The audio output module 153 outputs audio relating to a particular function or status, such as call received, message received, or errors.

The output unit 150 is further illustrated having an alarm module 155, which may signal or otherwise identify the occurrence of a particular event associated with the mobile terminal 100. Typical events include call received, message received and user input received.

An example of a signal provided by the output unit 150 is a tactile sensation. For example, the alarm module 155 may be configured to vibrate responsive to the mobile terminal 100 receiving a call or message. As another example, vibration may be provided by the alarm module 155 responsive to receiving user input at the mobile terminal 100 in order to provide a tactile feedback mechanism. It is understood that the various signals provided by the components of output unit 150 may be separately performed, or performed using any combination of such components.

The memory 160 is generally used to store various types of data to support the processing, control, and storage requirements of the mobile terminal 100. Examples of such data include program instructions for applications operating in the mobile terminal 100, contact data, phonebook data, messages, pictures, and video.

The memory 160 shown in FIG. 1 may be implemented using any type or combination of suitable volatile and non-volatile memory or storage devices. Examples of memory types are random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk memory, card-type memory, and other similar memory or data storage devices.

The interface unit 170 may be implemented to couple the mobile terminal 100 with external devices. Typical external devices include wired/wireless headphones, external chargers, power supplies, storage devices configured to store data such as audio, video, and pictures, earphones, and microphones. The interface unit 170 may be configured using a wired/wireless data port, audio input/output ports, video input/output ports, or a card socket for coupling to a memory card, subscriber identity module (SIM) card, user identity module (UIM) card, or a removable user identity module (RUIM) card.

The controller 180 typically controls the overall operations of the mobile terminal 100. For example, the controller 180 performs the control and processing associated with voice calls, data communications, instant message communication, video calls, camera operations and recording operations.

The controller 180 may include a multimedia module 181 that provides multimedia playback. The multimedia module 181 may be configured as part of the controller 180, or implemented as a separate component. Alternatively, the multimedia module 181 may be implemented as a software program.

The power supply 190 provides power required by the various components for the mobile terminal 100. The power may be internal power, external power, or combinations thereof.

The mobile terminal 100 may include a wired/wireless communication system and a satellite-based communication system. The mobile terminal 100 may be configured to operate in a communication system transmitting data as frames or packets.

The exterior of the mobile terminal 100 will hereinafter be described in detail with reference to FIGS. 2 and 3. For convenience, the mobile terminal 100 is described with reference to a bar-type mobile phone equipped with a full touch screen. However, the present invention is not restricted to a slider-type mobile phone and may be applied to various mobile phones other than a slider-type mobile phone. For example, the present invention may be applied to a folder-type mobile phone, a swing-type mobile phone and a slider-type mobile phone.

Figure 2:
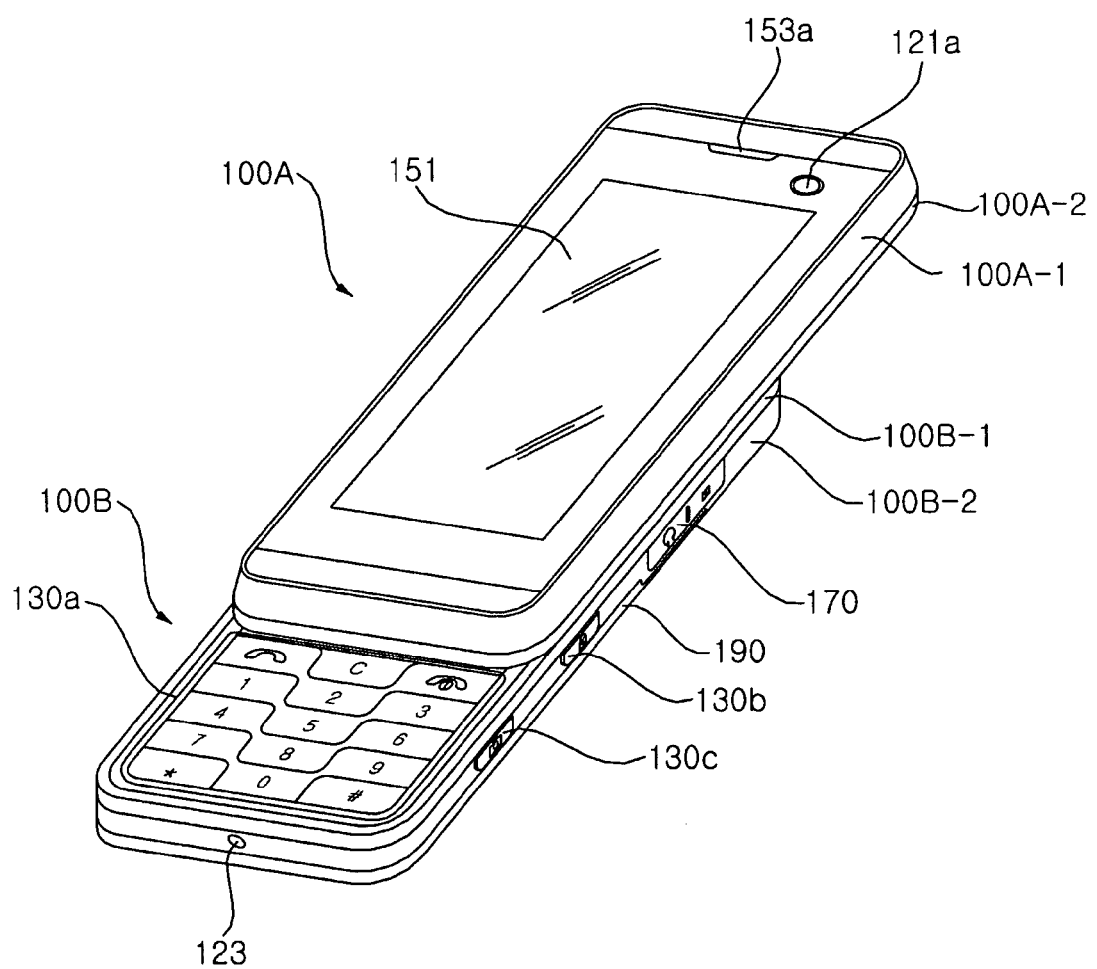
FIG. 2 illustrates a front perspective view of the mobile terminal illustrated in FIG. 1.

FIG. 2 illustrates a front perspective view of the mobile terminal 100 illustrated in FIG. 1. As illustrated in FIG. 2, the mobile terminal 100 includes a first body 100A and a second body 100B configured to slide in at least one direction with respect to the first body.

When the first body 100A overlaps the second body 100B, the mobile terminal 100 may be determined to be closed. When the first body 100A exposes at least part of the second body 100B, the mobile terminal 100 may be determined to be opened.

When the mobile terminal 100 is closed, the mobile terminal may generally operate in an idle mode and may be manually released from the idle mode by a user. When the mobile terminal 100 is opened, the mobile terminal 100 may generally operate in a call mode and may be placed in the idle mode either manually by a user or automatically after the lapse of a predetermined amount of time.

The first body 100A is shown formed of a first case 100A-1 and a second case 100A-2. The second body 100B is shown formed of a first case 100B-1 and a second case 100B-2. The first case 100A-1 and second case 100A-2 of the first body 100A and the first case 100B-1 and second case 100B-2 or the second body 100B are usually formed of a suitably rigid material, such as injection molded plastic, or formed using metallic material, such as stainless steel (STS) and titanium (Ti).

One or more intermediate cases may be provided between the first case 100A-1 and second case 100A-2 of the first body 100A or between the first case 100B-1 and second case 100B-2 of the second body 100B. The first body 100A and second body 100B are typically sized to receive electronic components necessary to support operation of the mobile terminal 100.

The first body 100A is illustrated having a first camera 121a and first audio output module 153a, which is configured as a speaker, positioned relative to the display module 151. The first camera 121a may be constructed such that it can be selectively positioned relative to first body 100A, such as by rotation or swiveling.

The first audio output module 153a may be implemented as a receiver or a speaker. The first camera 121a may be configured to capture a still image or a moving image of a user.

The display module 151 is illustrated as an LCD or OLED. The display 151 module may also be configured as a touch screen having an underlying touchpad which generates signals responsive to user contact with the touch screen, such as with a finger or stylus.

A first user input module 130a may be located at the front of the second body 100B, specifically on the front of the first case 100B-1 of the second body. Second and third user input modules 130b and 130c, the microphone 123 and the interface unit 170 may be located on the first case 100B-1 or the second case 100B-2 of the second body.

The first through third user input modules 130a through 130c may be collectively referred to as the user input unit 130. The user input unit 130 may adopt various manipulation methods as long as it can offer tactile feedback to a user.

For example, the user input unit 130 may be implemented as a dome switch or a touch pad which receives a command or information upon being pushed or touched by a user. Alternatively, the user input unit 130 may be implemented as a wheel, a jog dial, or a joystick.

The first user input module 130a may allow a user to input various commands such as 'start', 'end', and 'scroll' and various numbers, characters or symbols. The second and third user input module 130b and 130c may serve as hot keys for activating certain functions of the mobile terminal 100. The microphone 123 may be configured to be able to receive the voice of a user or other sounds.

The power supply unit 190 may be located on the rear of the second case 100B-2 of the second body 100B. The power supply unit 190 may be a rechargeable battery and may be coupled to the second body 100B so as to be attachable to or detachable from the second body 100B.

Figure 3:
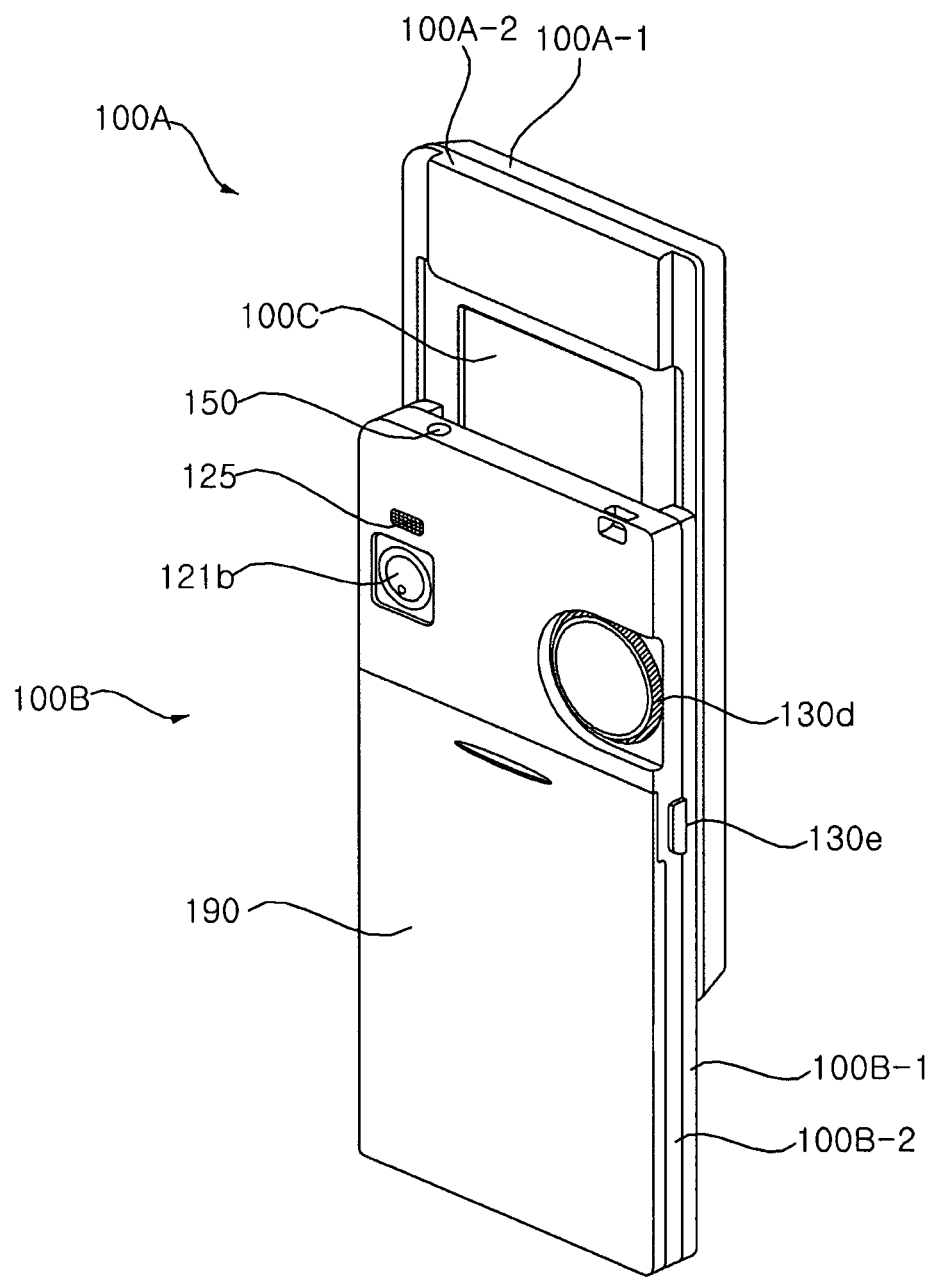
FIG. 3 illustrates a rear perspective view of the mobile terminal illustrated in FIG. 1.

FIG. 3 illustrates a rear perspective view of the mobile terminal 100 illustrated in FIG. 2. As illustrated in FIG. 3, a fourth user input module 130d and a second camera 121b are located at the rear of the second case 100B-2 of the second body 100B. The fourth user input module 130d may be a wheel type. In addition, a fifth user input module 130e may be disposed on a lateral side of the second body 100B.

The second camera 121b may have a different photographing direction than the first camera 121a illustrated in FIG. 2. The second camera 121b may also have a different resolution than the first camera 121a.

For example, the first camera 121a may be used to capture an image of the face of a user and then readily transmit the captured image during a video call. Therefore, a low-resolution camera may be used as the first camera 121a.

The second camera 121b may be used to capture an image of an ordinary subject. Since images captured by the second camera 121b generally do not need to be transmitted, a high-resolution camera may be used as the second camera.

A camera flash 125 and a mirror (not shown) may be located near the second camera 121b. The camera flash 125 illuminates a subject when the second camera 121b captures an image of the subject. The user may look in the mirror for taking a self image.

A second audio output module (not shown) may be provided at the rear of the second case 100B-2 of the second body 100B. The second audio output module may enable a stereo function in conjunction with the first audio output module 153a. The second audio output module may also be used during a speaker-phone mode.

An antenna (not shown) for receiving a broadcast signal may be located on one side of the second case 100B-2 of the second body 100B. The antenna may be installed such that it can be extracted from the second body 100B.

A slider module 100C may be located on the rear of the second case 100A-2 of the first body 100A. The slider module 100C may couple the first body 100A to the second body 100B so that the first body and the second body can slide up or down with respect to each other. The slider module 100C may be partially exposed by the second front case 100B-1.

The second camera 121b is illustrated in FIG. 3 as being disposed on the second body 100B. However the present invention is not restricted to this configuration.

For example, at least the antenna, the second camera 121b or the camera flash 125 may be mounted on the first body 100A and, specifically, on the first case 100A-2 of the first body. In this configuration, whichever of the antenna, the second camera 121b or the camera flash 125 is mounted on the second case 100A-2 of the first body 100A may be protected by the second body 100B when the mobile terminal 100 is closed.

The first camera 121a may be able to rotate and thereby cover the photographing direction of the second camera 121a. In this configuration, the second camera 121b may be optional.

The power supply unit 190 may be disposed on the second case 100B-2 of the second body 100B. The power supply unit 190 may be a rechargeable battery and may be coupled to the second body 100B such that it is attachable to or detachable from the second body.

Figure 4:
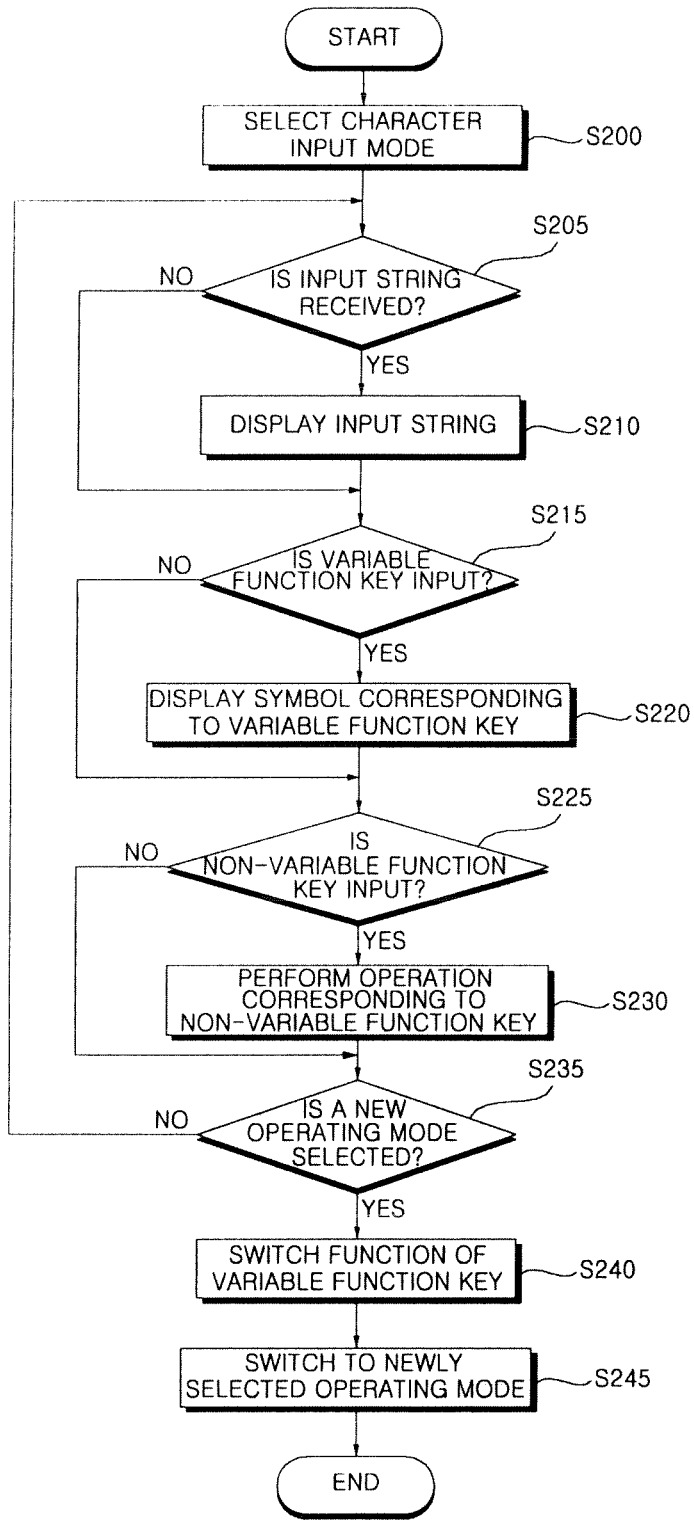
FIG. 4 illustrates a flowchart of a method of controlling a mobile terminal according to a first exemplary embodiment of the present invention.

FIG. 4 illustrates a flowchart of a method of controlling a mobile terminal 100 according to a first exemplary embodiment of the present invention. As illustrated in FIG. 4, if the user selects a character input mode for writing a message or a memo (S200), the controller 180 may place the mobile terminal 100 in the character input mode and may display a string input by the user via a number of character keys on the display module 151 (S210).

The character keys may be keys for inputting numbers or characters in various languages. If the display module 151 is a touch screen, a touch keypad input window may be displayed on the display module 151 and a user may input various characters simply by touching a number of key icons in the touch keypad input window.

If one of a plurality of variable function keys is input (S215) when the input string is displayed on the display module 151, a symbol corresponding to the input variable function key may be displayed (S220). The variable function keys may be any symbol keys other than the character keys. For example, the variable function keys may include a '*' key and a '#' key. Alternatively, if the touch keypad input window is displayed on the display module 151, the variable function keys may be input as touch key icons corresponding to the symbols '*' and '#'.

The user may determine a number of symbol keys to be used as the variable function keys in advance. The variable function keys may be used to input various symbols such as ':', '~', '/', and '-', which are often used to represent a date, time and phone number, or other various frequently used symbols or emoticons.

If a non-variable function key, such as a 'delete' key or a 'move' key, is input (S225), the controller 180 may perform an operation corresponding to the input function key (S230).

Steps S205 through S230 may be repeatedly performed until a user selects a new operating mode different than the character input mode (S235). If the user selects a new operating mode different than the character input mode (S235), the controller 180 may return the variable function keys to their original functions (S240) and may switch the mobile terminal 100 to the newly selected operating mode (S245).

The method illustrated in FIG. 4 allows a user to input various symbols by using a number of symbol keys that tend to be less frequently used in the character input mode as variable function keys.

Figure 5:
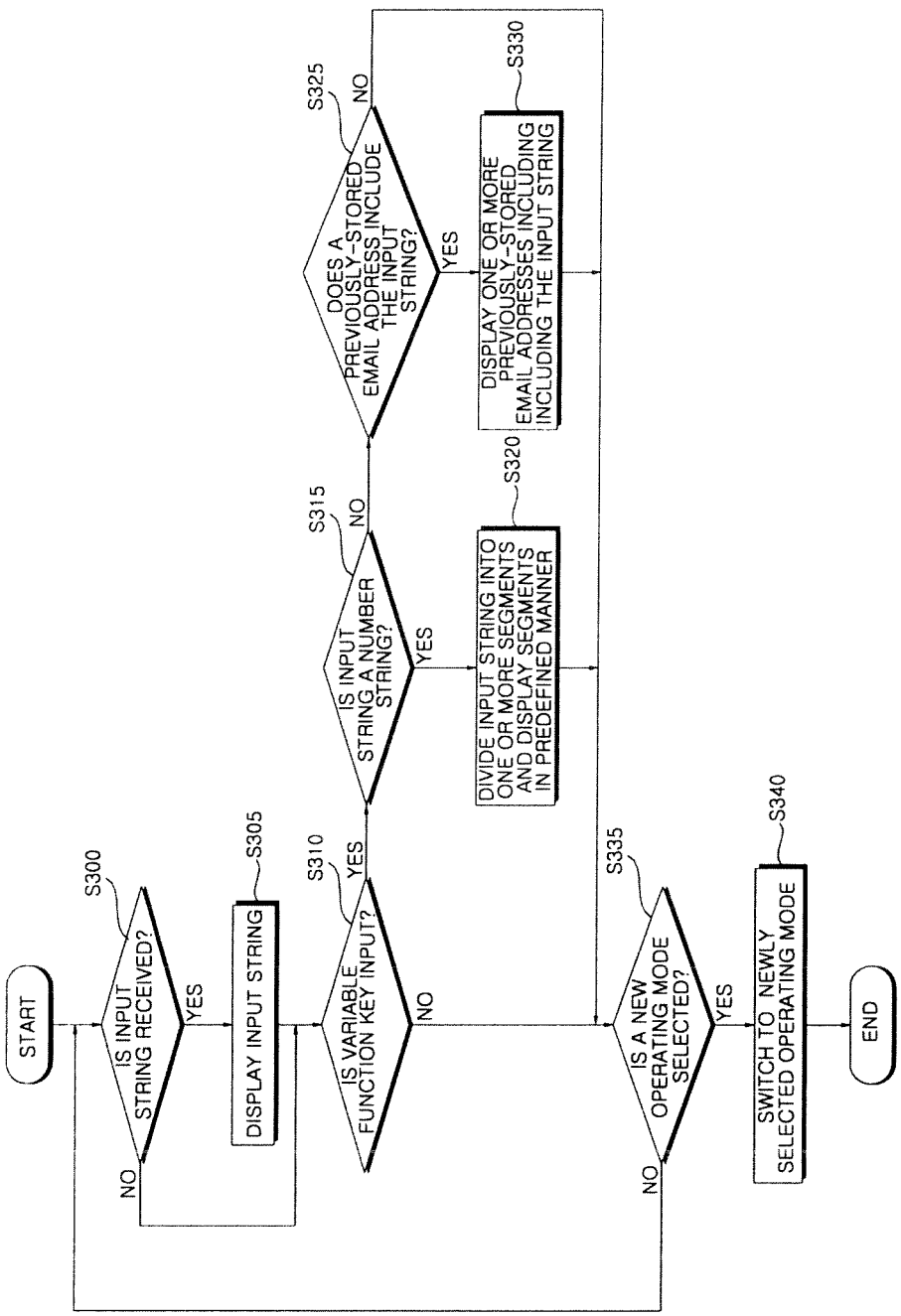
FIG. 5 illustrates a flowchart of a method of controlling a mobile terminal according to a second exemplary embodiment of the present invention.

FIG. 5 illustrates a flowchart of a method of controlling a mobile terminal 100 according to a second exemplary embodiment of the present invention. As illustrated in FIG. 5, if the user inputs a string by pressing a number of character keys of a keypad or touching a number of key icons of a touch keypad (S300), the controller 180 may display the input string on the display module 151 (S310). Thereafter, if a variable function key is input when the input string is displayed on the display module 151 (S310), the controller 180 may determine whether the input string is a number string (S315).

If the input string is a number string, the controller 180 may divide the input string into a number of segments and display the segments in a predetermined manner for representing a phone number, a date, a time, or an amount of money (S320). If the input string is '0220447796', the controller 180 may transform the input string into a phone number string '02-2033-7796'. If the input string is '1203', the controller 180 may transform the input string into a date-indicator string 'December 3' or a time-indicator string '12:03'. If the input string is '3000000', the controller 180 may transform the input string into a money amount indicator string '3,000,000' and display a symbol for the Korean currency, Won, or the dollar symbol '$' next to the input string.

If the input string is not a number string, the controller 180 may determine if any previously stored e-mail address in memory includes the input string (S325). If an email address including the input string is stored in the memory 160 (S325), the controller 180 may display the email address on the display module 151 (S330). If the input string is 'abcd' and an email address 'abcd@lge.com' is present in the memory 160, the controller 180 may display the email address 'abcd@lge.com' on the display module 151. If more than one email address stored in the memory 160 includes the input string, the controller 180 may display all the email addresses including the input string and may allow the user to choose one of the displayed email addresses.

Operations S300 through S330 may be repeatedly performed until a user selects a new operating mode different than the current operating mode (S335). If the user selects a new operating mode different than the character input mode (S335), the controller 180 may switch the mobile terminal 100 to the newly selected operating mode (S340).

The method illustrated in FIG. 5 allows a user to input a phone number, an email address, or an amount of money with ease by using a number of variable function keys.

Figure 6:
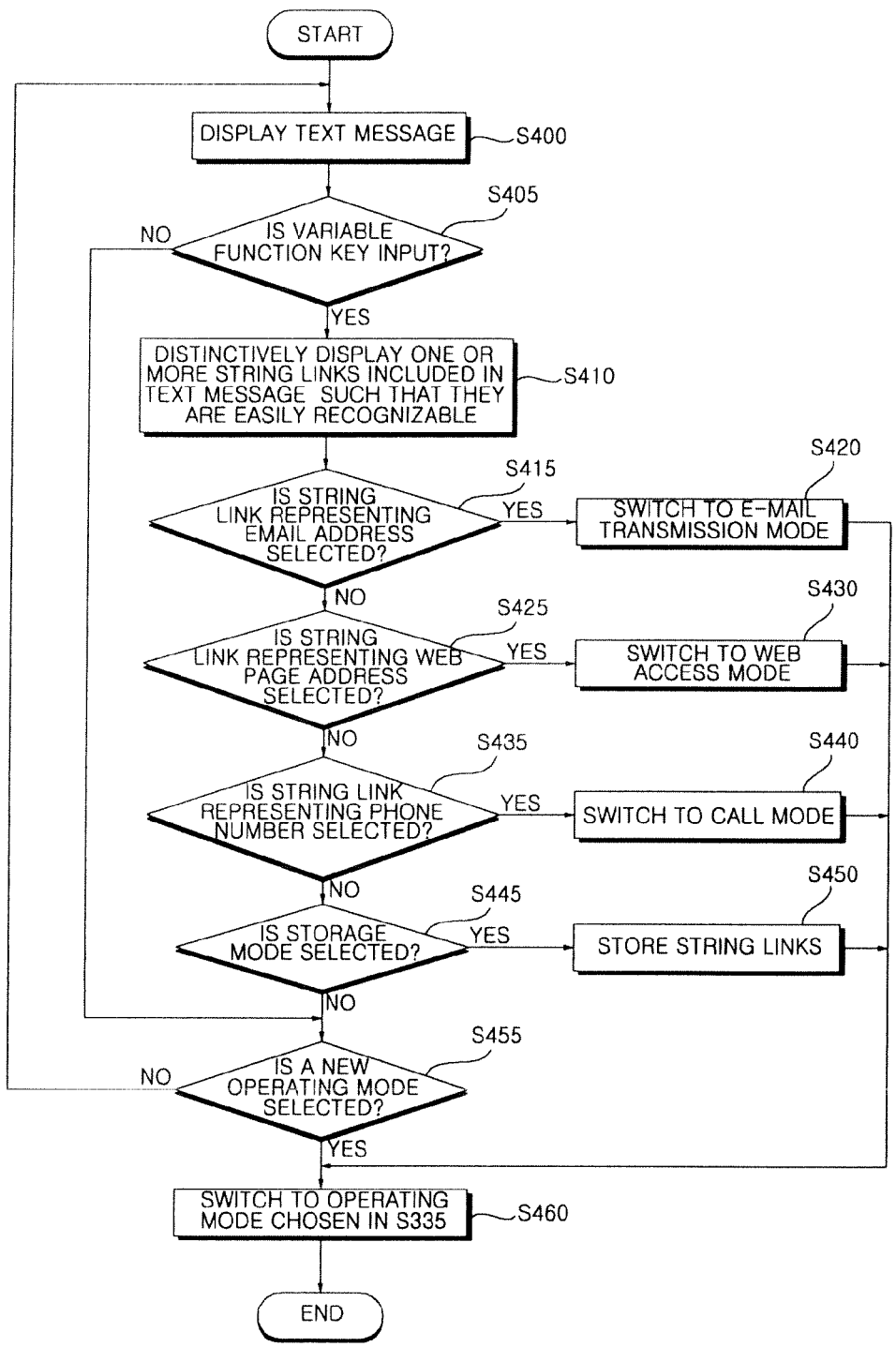
FIG. 6 illustrates a flowchart of a method of controlling a mobile terminal according to a third exemplary embodiment of the present invention.

FIG. 6 illustrates a flowchart of a method of controlling a mobile terminal 100 according to a third exemplary embodiment of the present invention. As illustrated in FIG. 6, if a menu for viewing text messages is chosen, the controller 180 may display a text message desired by the user on the display module 151 (S400). Thereafter, if a variable function key is input (S405), the controller 180 may set a number of strings chosen from the text message as string links to which various operating modes can be linked and may distinctively display the string links such that they are easily recognizable (S410).

Each of the string links may represent a phone number, an e-mail address or a web page address. Examples of various operating modes that can be linked to the string links are a call mode, an e-mail transmission mode and a web access mode. The user may determine a number of strings to be set as string links in advance.

If a string link representing an e-mail address is selected (S415), the controller 180 may switch the mobile terminal 100 to the e-mail transmission mode (S420). The user may then send an e-mail to the email address represented by the chosen string link.

If a string link representing a web page address is selected (S425), the controller 180 may drive a web browser and switch the mobile terminal 100 to the web access mode (430). The user may then access a web page corresponding to the web page address represented by the chosen string link.

If a string link representing a phone number is selected (S435), the controller 180 may switch the mobile terminal 100 to the call mode (S440). The user may then make a call to the phone number represented by the chosen string link.

If a storage mode is selected (S445), the controller 180 may store some or all of the string links (S450). Specifically, the controller 180 may classify the string links and may store the string links in a phone number list, an email address list or a web page address list according to the classification.

The controller 180 may store all the string links. Alternatively, the controller 180 may store only some of the string links selected by the user. Each of the string links may be selected in response to a touch input or a key input received via the user input unit 130.

Operations S400 through S450 may be repeatedly performed until a user selects a new operating mode different than a current operating mode (S455). If the user selects a new operating mode different than the current operating mode (S455), the controller 180 may switch the mobile terminal 100 to the newly selected operating mode (S460).

The method illustrated in FIG. 6 allows a user to efficiently use a phone number or an email address included in a received text message.

FIGS. 7 through 12 illustrate diagrams for explaining the methods of the first through third exemplary embodiments.

Figure 7:
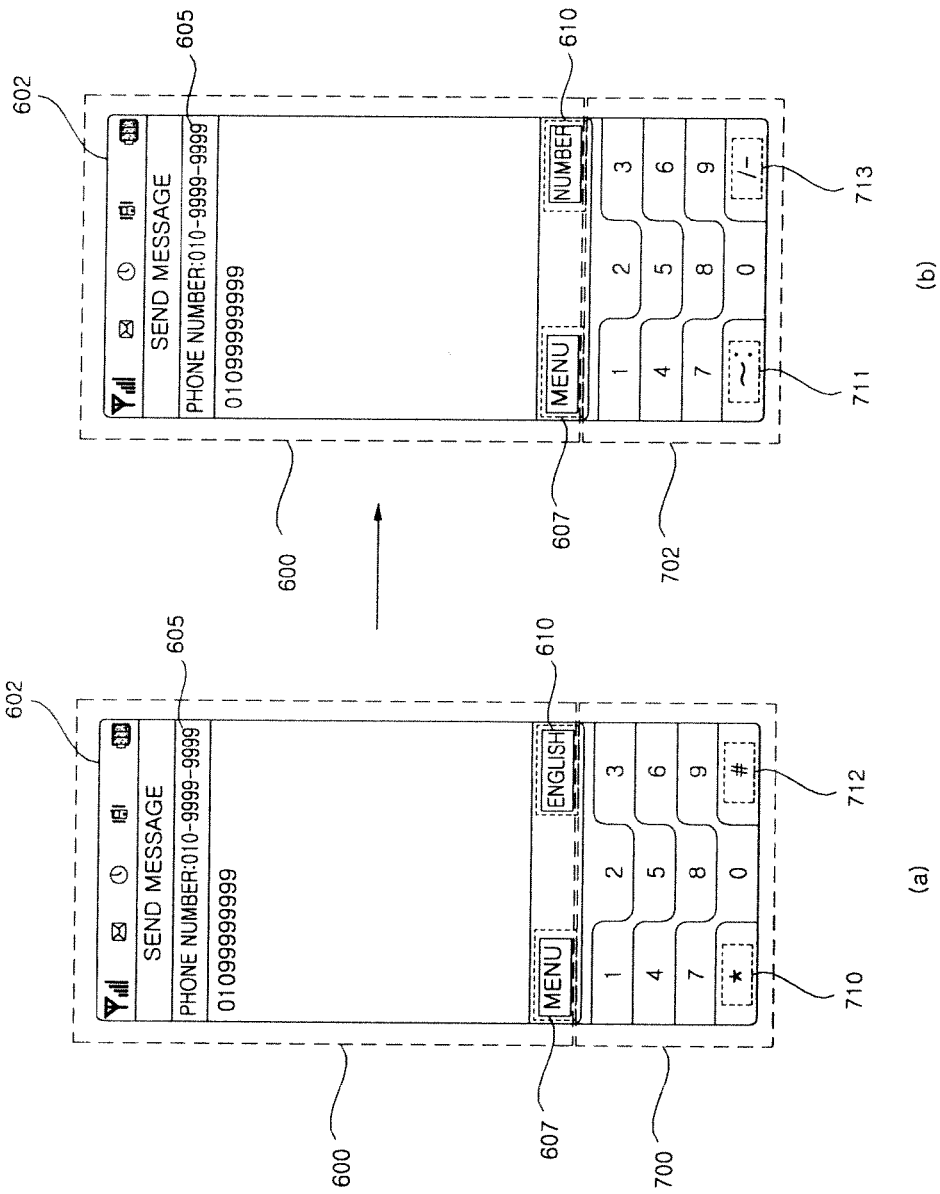
Figure 8:
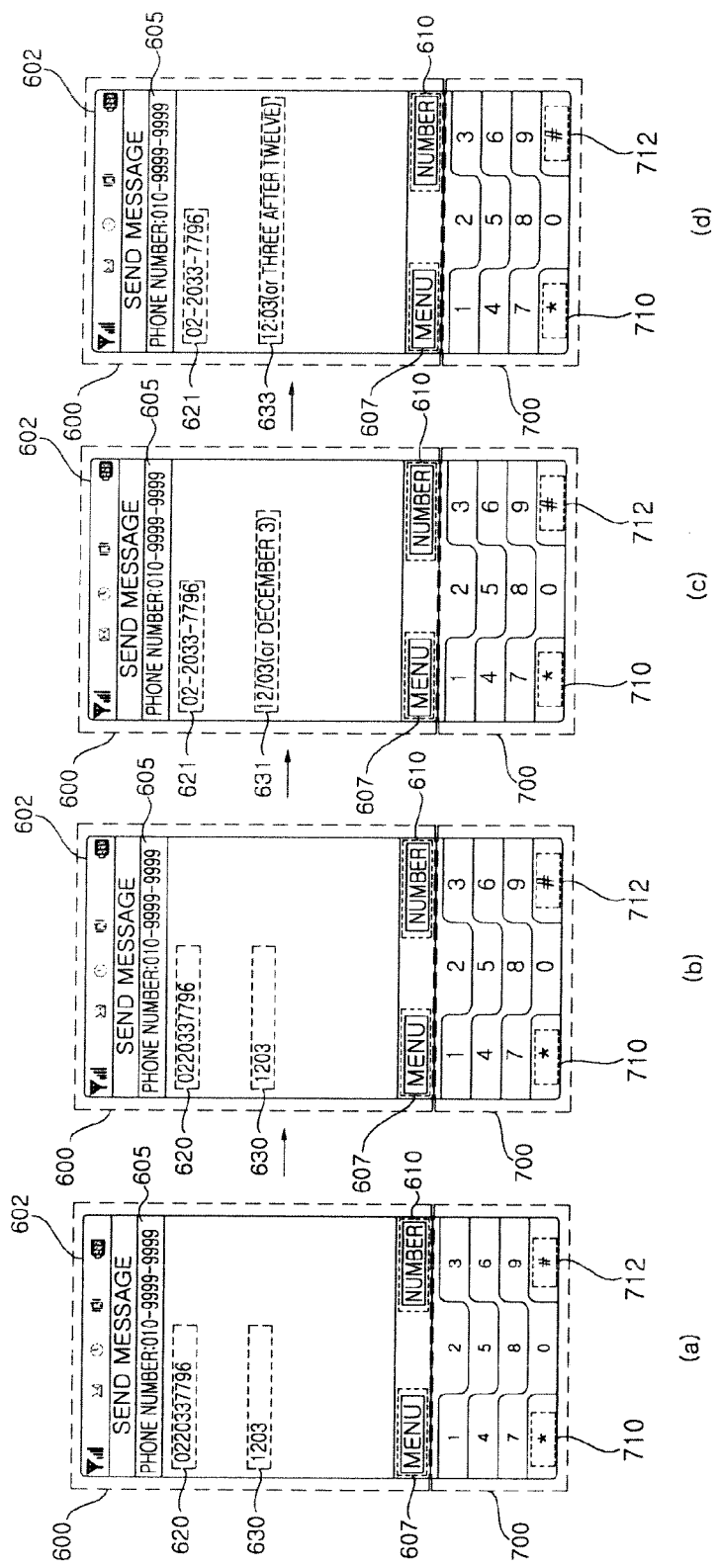
Figure 9:
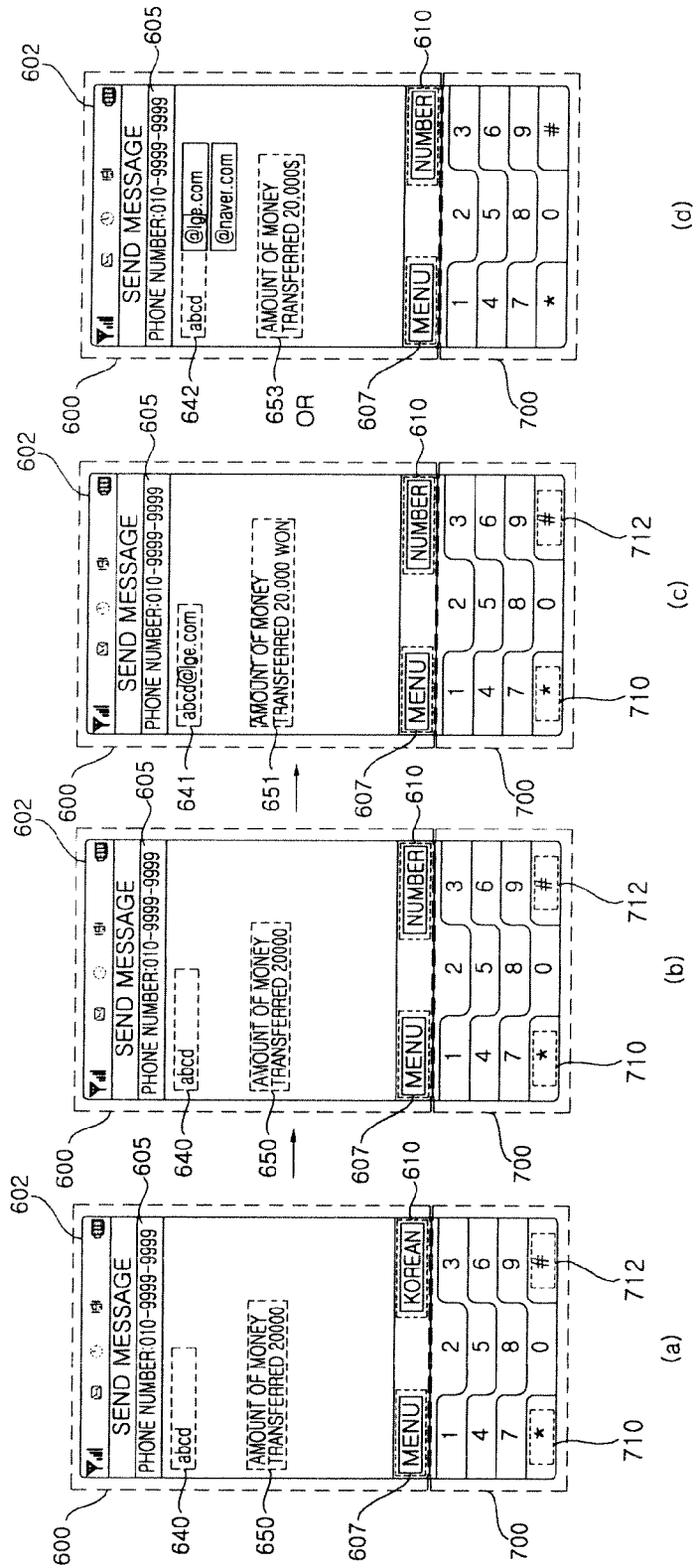
Figure 10:
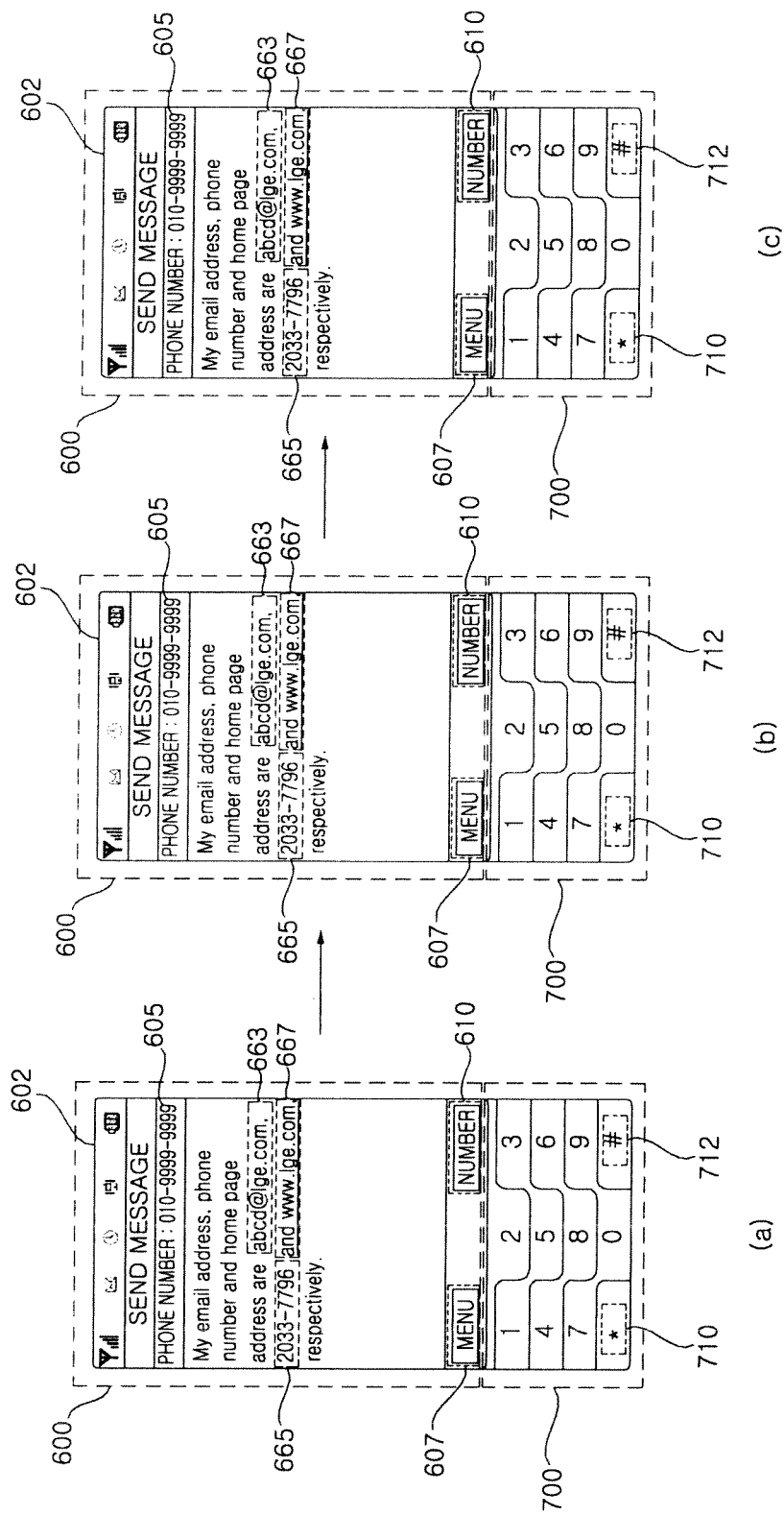

FIG. 7 illustrates diagrams of a 'send message' page 600 and a keypad 700. As illustrated in FIG. 7, a plurality of indicator icons 602 indicating received signal intensity, remaining battery power, and a current time may be displayed at the top of the 'send message' page 600, and a plurality of menu items of a menu currently being executed and a phone number 605 to which a current message is to be sent may be displayed below the indicator icons. A number of characters input through the keypad 700 may be displayed on the 'send message' page 600, and a plurality of menu icons, such as a 'menu' icon 605 and an 'English' icon 610 for switching a Korean keyboard to an English keyboard, may be displayed at the bottom of the 'send message' page 600.

The keypad 700 may include a plurality of keys for inputting characters or numbers. A '*' key 710 and a '#' key 712, which are used less frequently than the other keys of the keypad 700 during a character input mode, may be used as variable function keys. A touch keypad input window displayed on the display module 151 may be used to input characters or numbers instead of the keypad 700.

During an idle mode, the '*' key 710 and the '#' key 712 may be used for setting a vibration mode or locking the mobile terminal 100. On the other hand, during the character input mode, the '*' key 710 and the '#' key 712 may be used to input various symbols such as '~', ':', '/', and '-'. As illustrated in FIG. 7(b), if a touch keypad 702 is used instead of the keypad 700, a '~:' touch key icon 711 and a '/-' touch key icon 713 may be provided instead of the '*' key 710 and the '#' key 712 when the mobile terminal 100 enters the character input mode.

If the '~:' touch key icon 711 is touched once, the symbol '~' may be input. If the '~:' touch key icon 711 is touched twice in a row or pressed for a specified time, the symbol ':' may be input.

Likewise, if the '/-' touch key icon 713 is touched once, the symbol '/' may be input. If the '/-' touch key icon 711 is touched twice in a row or pressed for a specified time, the symbol '-' may be input.

As illustrated in FIGS. 8(a) through 8(c), if a '*' key 710 or a '#' key 712 is input when number strings 620 '0220337796' and 630 '1203' are displayed on a 'send message' page, the number strings may be transformed into, respectively, a phone number string 621 '02-2033-7796' and a date-indicator string 631 '12/03' or 'December 3'. As illustrated in FIG. 8(d), the date-type number string 631 may be transformed into a time-indicator string 633 '12:03' or 'Three after twelve' when the '*' key 710 or the '#' key 712 is input. Specifically, if the '*' key 710 or the '#' key 712 is input, the date-type number string 631 may be transformed into either the time-indicator string 633 '12:03' or 'Three after twelve' according to whether a 'Korean' menu icon 610 is input.

As illustrated in FIGS. 9(a) through 9(c), if a '*' key 710 or a '#' key 712 is input when a string 640 'abcd' and a string 650 'Amount of Money Transferred 20000' are displayed, an email address 641 'abcd@lge.com' having the string 640 'abcd' may be displayed and the string 650 may be transformed into a string 651 'Amount of Money Transferred 20,000 Won'.

As illustrated in FIG. 9(d), if there is more than one email address including the string 640 'abcd', all the email addresses 642 including the string 'abcd' may be displayed and the user may be allowed to choose one of the displayed email addresses. The string 650 may also be transformed into a string 653 'Amount of Money Transferred 20,000$' at the user's request.

As illustrated in FIGS. 10(a) through 10(c), if a '*' key 710 or a '#' key 712 is input when a received text message including a string link 663 representing an email address 'abcd@lge.com', a string link 665 representing a phone number '2033-7796', and a string link 667 representing a web page address 'www.lge.com' is displayed on an 'inbox' page 660, the string links may be displayed distinctively such that are easily recognizable. For example, the string links 663, 665 and 667 may be underlined, as illustrated in FIG. 10(c).

As illustrated in FIG. 11(a), if a string link 663 representing an email address 'abcd@lge.com' is selected by being touched, a 'send message' page 670 may be displayed and the user may send an email to the email address 'abcd@lge.com'. As illustrated in FIGS. 12(a) and 12(b), if a string link 665 representing a phone number '2033-7796' is selected by being touched, a call mode screen 680 may be displayed and the user may make a call to the phone number '2033-7796'.

The method illustrated in FIGS. 7-11 allows a user to readily enter an email transmission mode, a call mode, or a web access mode simply by selecting one of a plurality of string links. Furthermore, a plurality of string links may be displayed distinctively such that they are easily recognizable. Moreover, a number of string links chosen by the user may be stored or may be sent to another user.

The mobile terminal and the method of controlling a mobile terminal according to the present invention are not restricted to the exemplary embodiments set forth herein. Variations and combinations of the exemplary embodiments set forth herein may fall within the scope of the present invention.

The present invention can be realized as code that can be read by a processor (such as a mobile station modem (MSM)) included in a mobile terminal and that can be written on a computer-readable recording medium. The computer-readable recording medium may be any type of recording device in which data is stored in a computer-readable manner. Examples of the computer-readable recording medium include a ROM, a RAM, a CD-ROM, a magnetic tape, a floppy disc, an optical data storage, and a carrier wave (e.g., data transmission through the internet). The computer-readable recording medium can be distributed over a plurality of computer systems connected to a network so that computer-readable code is written thereto and executed therefrom in a decentralized manner. Functional programs, code, and code segments needed for realizing the present invention can be easily construed by one of ordinary skill in the art.

The present invention makes it possible to effectively control the operation of a mobile terminal by using a number of variable function keys whose functions vary according to an operating mode. The present invention addresses the problems associated with a limited display size of a mobile terminal for allocating enough space for a user interface. Furthermore, the present invention improves the spatial efficiency of a mobile terminal and reduces complicated key manipulations for moving from one menu to another.

While the present invention has been particularly shown and described with reference to exemplary embodiments thereof, it will be understood by those of ordinary skill in the art that various changes in form and details may be made therein without departing from the spirit and scope of the present invention as defined by the following claims.

Depending on implementation, it is possible that the present invention can take the form of an entirely hardware embodiment, an entirely software embodiment or an embodiment containing both hardware and software elements. A software embodiment may include, but not be limited to, to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Other components may be coupled to the system. Input/output or I/O devices (including but not limited to keyboards, displays, pointing devices, etc.) can be coupled to the system either directly or through intervening I/O controllers. Network adapters (e.g., modem, cable modem, Ethernet cards) may also be coupled to the system to enable the data processing system to become coupled to other data processing systems or remote printers or storage devices through intervening private or public networks.

It should be understood that the logic code, programs, modules, processes, methods, and the order in which the respective elements of each method are performed are purely exemplary. Depending on the implementation, they may be performed in any order or in parallel, unless indicated otherwise in the present disclosure. Further, the logic code is not related, or limited to any particular programming language, and may be comprise one or more modules that execute on one or more processors in a distributed, non-distributed, or multiprocessing environment.

The method as described above may be used in the fabrication of integrated circuit chips. The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multi-chip package (such as a ceramic carrier that has either or both surface interconnections of buried interconnections).

In any case, the chip is then integrated with other chips, discrete circuit elements, and/or other signal processing devices as part of either (a) an intermediate product, such as a motherboard, or (b) and end product. The end product can be any product that includes integrated circuit chips, ranging from toys and other low-end applications to advanced computer products having a display, a keyboard or other input device, and a central processor.

Therefore, it should be understood that the invention can be practiced with modification and alteration within the spirit and scope of the appended claims. The description is not intended to be exhaustive or to limit the invention to the precise form disclosed. These and various other adaptations and combinations of the embodiments disclosed are within the scope of the invention and are further defined by the claims and their full scope of equivalents.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims. Therefore, all changes and modifications that fall within the metes and bounds of the claims, or equivalence of such metes and bounds are intended to be embraced by the appended claims.

The foregoing embodiments and advantages are merely exemplary and are not to be construed as limiting the present invention. The present teaching can be readily applied to other types of apparatuses.

The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A method of controlling a mobile terminal, the method comprising:

assigning at least a first function and a second function to each of one or more variable function keys, the first function corresponding to a first operating mode and the second function corresponding to a second operating mode;

performing the first function assigned to a specific one of the one or more variable function keys when the specific one of the one or more variable function keys is input during the first operating mode and performing the second function assigned to the specific one of the one or more variable function keys when the specific one of the one or more variable function keys is input during the second operating mode, wherein the first operating mode comprises a text message writing mode and the second operating mode comprises a text message viewing mode; and performing a fixed function assigned to a specific one of one or more non-variable function keys regardless of an operation mode of the mobile terminal when the specific one of one or more non-variable function keys is input, wherein the one or more non-variable function keys represent character keys of a keypad, wherein the one or more variable function keys represent remaining keys of the keypad other than the character keys of the keypad and comprises a "*" key, wherein performing the first function comprises:
  displaying an input string generated using the one or more character keys;
  determining that one of the one or more variable function keys is input while the input string is displayed;
  dividing the displayed input string into one or more segments in response to the determination; and
  displaying the segments in a predefined manner if the input string is a number string, the predefined manner representing the one or more segments as a phone number, date or time, and
wherein performing the second function comprises:
  detecting one or more predetermined strings from a text message displayed on a display unit;
  setting the detected one or more predetermined strings as string links to which a specific operating mode can be linked;
  displaying the string links as underlined when the specific one of the one or more variable function keys is input during the second operating mode;
  detecting a touch input received on one of the displayed string links, the touch input for selecting the touched string link; and
  entering an operation mode corresponding to the selected string link.

2. The method of claim 1, wherein the one or more variable function keys further comprises a '#' key.

3. The method of claim 1, wherein assigning the at least a first function and a second function to each of the one or more variable function keys comprises processing an input from a user.

4. A mobile terminal comprising:
  a display unit configured to display data;
  a user input unit comprising one or more variable function keys, wherein at least a first function and a second function are assigned to each of the one or more variable function keys, the first function corresponding to a first operating mode and the second function corresponding to a second operating mode; and
  a controller configured to:
    perform the first function assigned to a specific one of the one or more variable function keys when the specific one of the one or more variable function keys is input during the first operating mode;
    perform the second function assigned to the specific one of the one or more variable function keys when the specific one of the one or more variable function keys is input during the second operating mode, wherein the first operating mode comprises a text message writing mode and the second operating mode comprises a text message viewing mode; and
    perform a fixed function assigned to a specific one of one or more non-variable function keys regardless of an operation mode when the specific one of one or more non-variable function keys is input,
  wherein the one or more non-variable function keys represent character keys of a keypad,
  wherein the one or more variable function keys represent remaining keys of the keypad other than the character keys of the keypad and comprises a "*" key,
  wherein the controller is further configured to perform the first function by:
    controlling the display unit to display an input string generated using the one or more character keys;
    determining that one of the one or more variable function keys is input while the input string is displayed;
    controlling the display unit to divide the displayed input string into one or more segments in response to the determination; and
    controlling the display unit to display the segments in a predefined manner if the input string is a number string, the predefined manner representing the one or more segments as a phone number, date or time, and
  wherein the controller is further configured to perform the second function by:
    detecting one or more predetermined strings from a text message displayed on the display unit;
    setting the detected one or more predetermined strings as string links to which a specific operating mode can be linked;
    displaying the string links as underlined when the specific one of the one or more variable function keys is input during the second operating mode,
    detecting a touch input received on one of the displayed string links, the touch input for selecting the touched string link; and
    entering an operation mode corresponding to the selected string link.

5. The mobile terminal of claim 4, wherein the one or more variable function keys further comprises a '#' key.

6. The mobile terminal of claim 4, wherein the controller is further configured to process an input from a user in order to assign the at least a first function and a second function to each of the one or more variable function keys.

7. The method of claim 1, wherein each of the one or more predetermined strings represents a phone number, an e-mail address or a web page address.

8. The method of claim 7, wherein performing the second function further comprises:
  switching the mobile terminal to an e-mail transmission mode for sending an email when the string link representing the e-mail address is selected from the text message;
  switching the mobile terminal to a web access mode for accessing a web page when the string link representing the web page address is selected from the text message;
  switching the mobile terminal to a call mode for making a telephone call when the string link representing the phone number is selected from the text message; and
  storing at least one string link when a storage mode is selected.

9. The method of claim 8, wherein storing the at least one string link comprises classifying each of the at least one string link and storing each of the at least one string link in a phone number list, an e-mail address list or a web page address list according to the classification.

10. The method of claim 1, wherein performing the first function comprises setting the mobile terminal in a vibration mode when the specific one of the one or more variable function keys is input during the first operating mode.

11. The mobile terminal of claim 4, wherein each of the one or more predetermined strings represents a phone number, an e-mail address or a web page address.

12. The mobile terminal of claim 11, wherein the controller is further configured to:
  switch the mobile terminal to an e-mail transmission mode for sending an email when the string link representing the e-mail address is selected from the text message;
  switch the mobile terminal to a web access mode for accessing a web page when the string link representing the web page address is selected from the text message;

switch the mobile terminal to a call mode for making a telephone call when the string link representing the phone number is selected from the text message; and store at least one string link when a storage mode is selected.

13. The mobile terminal of claim 12, wherein the controller is further configured to classify each of the at least one string link and store each of the at least one string link in a phone number list, an e-mail address list or a web page address list according to the classification.

14. The mobile terminal of claim 4, wherein the controller is further configured to set the mobile terminal in a vibration mode when the specific one of the one or more variable function keys is input during the first operating mode.

\* \* \* \* \*